United States Patent
Biswas et al.

(10) Patent No.: US 10,878,308 B2
(45) Date of Patent: Dec. 29, 2020

(54) METHOD AND SYSTEM FOR DETECTING EMOTIONS BASED ON TYPING BEHAVIOUR

(71) Applicant: Abhishek Biswas, Kolkata (IN)

(72) Inventors: Abhishek Biswas, Kolkata (IN);
Kaustav Banerjee, Kolkata (IN);
Samudraneel Saha, Kolkata (IN)

(73) Assignee: Abhishek Biswas, Kolkata (IN)

( * ) Notice: Subject to any disclaimer, the term of this patent is extended or adjusted under 35 U.S.C. 154(b) by 726 days.

(21) Appl. No.: 15/367,204

(22) Filed: Dec. 2, 2016

(65) Prior Publication Data

US 2017/0161629 A1    Jun. 8, 2017

(30) Foreign Application Priority Data

Dec. 2, 2015    (IN) ........................... 1234/KOL/2015

(51) Int. Cl.
*G06N 3/02*    (2006.01)

(52) U.S. Cl.
CPC ................................ *G06N 3/02* (2013.01)

(58) Field of Classification Search
CPC ....................................................... G06N 3/02
USPC .......................................................... 706/20
See application file for complete search history.

(56) References Cited

U.S. PATENT DOCUMENTS

| 2014/0074945 | A1* | 3/2014 | Kanevsky | ............... | G10L 25/63 709/206 |
| 2014/0136450 | A1* | 5/2014 | Lee | ........................ | G06N 7/005 706/11 |
| 2014/0321737 | A1* | 10/2014 | Movellan | ........... | G06K 9/00302 382/159 |
| 2018/0077095 | A1* | 3/2018 | Deyle | ..................... | H04L 51/10 |

OTHER PUBLICATIONS

Stathopoulou, I. O., et al. "On Assisting a Visual-Facial Affect Recognition System with Keyboard-Stroke Pattern Information." Knowledge-Based Systems, vol. 23, No. 4, Jan. 2010, pp. 350-356. EBSCOhost, doi:10.1016/j.knosys.2009.11.007. (Year: 2009).*
Nahin, A. F. M.Nazmul Hague, et al. "Identifying Emotion by Keystroke Dynamics and Text Pattern Analysis." Behaviour & Information Technology, vol. 33, No. 9, Sep. 2014, pp. 987-996. EBSCOhost, doi:10.1080/0144929X.2014.907343. (Year: 2014).*
Tsihrintzis et al. "Towards Improving Visual-Facial Emotion Recognition through Use of Complementary Keyboard-Stroke Pattern Information." 5th International Conference on Information Technology: New Generations (Itng 2008), Information Technology: New Generations, 2008. ITNG 2008. p. 32.*
Preeti et al "Recognising Emotions from Keyboard Stroke Pattern." International Journal of Computer Applications, vol. 11, No. 9, 2010, pp. 1-5., doi:10.5120/1614-2170.*

* cited by examiner

*Primary Examiner* — Lut Wong
(74) *Attorney, Agent, or Firm* — Dave Law Group LLC; Raj S. Dave (57) ABSTRACT

The present disclosure generally relates to analysis and detection of human emotions, and more particularly, to a
(Continued)

method and system for detection of human emotion based on an individual's typing behavior. In one embodiment, the method comprises of receiving typing data of the individual for a specified amount of time, processing the received data to extract hand speed and key-press duration for the individual and analyzing the hand speed and key-press duration to detect probable emotional states the individual has experienced for the specified amount of time.

8 Claims, 7 Drawing Sheets

METHOD AND SYSTEM FOR DETECTING EMOTIONS BASED ON TYPING BEHAVIOUR

PRIORITY CLAIM

This U.S. patent application claims priority under 35 U.S.C. § 119 to: India Application No. 1234/KOL/2015, filed on Dec. 2, 2015. The entire contents of the aforementioned application are incorporated herein by reference.

TECHNICAL FIELD

This disclosure relates generally to analysis and detection of human emotions, and more particularly to a method and system for detection of human emotion based on an individual's typing behavior.

BACKGROUND

Emotion detection is a field of technology where a considerable amount of research has been taking place for a long period of time. Existing prior art illustrates recognition and detection of emotion with the help of various techniques. One of the most used and commonly researched area of detecting emotion is by means of using a video feed and recognizing the facial expressions. Other methods such as using EEG signals, measurement and analysis of galvanic skin conductivity also exist.

Existing art also illustrate beginning the emotion detection process of an individual by asking the individual himself about what emotional state he is experiencing at that point of time Even when the individuals themselves were not asked to explain their emotional state, the biggest challenge of the state of the art has been that large and expensive tools have been a compulsory requirement for such purposes. As a result, hardware limitation has been a major factor in the field of emotion detection and analysis.

Thereby, analysis and detection of emotions without the use of large and expensive tools and therefore eliminating the hardware limitations is still considered as one of the biggest challenges of the technical domain.

SUMMARY

Embodiments of the present disclosure present technological improvements as solutions to one or more of the above-mentioned technical problems recognized by the inventors in conventional systems. For example, in one embodiment, a method and system is provided for detection of human emotion based on an individual's typing behavior.

In another embodiment of the present disclosure, the method comprises: receiving, by a processor, typing data of the individual for a specified amount of time; processing, by the processor, the received data to extract hand speed and key-press duration for the individual; and analyzing, by the processor, the hand speed and key-press duration to detect probable emotional states the individual has experienced for the specified amount of time.

In another embodiment of the present disclosure, a system for detecting emotions based on an individual's typing behavior is disclosed. The system may comprise one or more processors and a memory coupled to the one or more processors. The one or more processors may execute a plurality of modules stored in the memory. The plurality of modules may comprise a reception module, an extraction module and a data analysis module. The reception module may be adapted for receiving typing data of the individual for a specified period of time. The extraction module may be adapted for processing the received data to extract hand speed and key-press duration for the individual. The data analysis module may be adapted for analyzing the extracted data to detect probable emotional states the individual has experienced for the specified amount of time.

In another embodiment of the present disclosure, a non-transitory computer readable medium storing a program for detecting emotions based on an individual's typing behavior is disclosed. The program may comprise instructions for: receiving typing data of the individual for a specified period of time; processing the received data to extract hand speed and key-press duration for the individual; and analyzing the hand speed and key-press duration to detect probable emotional states the individual has experienced for the specified period of time.

It is to be understood that both the foregoing summary and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The present disclosure provides a computer implemented method and system for detecting human emotions based on an individual's typing behavior.

In an embodiment of the disclosure, the disclosure envisages a system which can efficiently analyze an individual's typing behavior and predict the individual's emotional state. The emotions which have been taken into perspective and predicted accurately are happiness, surprise, fear, sadness, disgust and anger.

Figure 1:
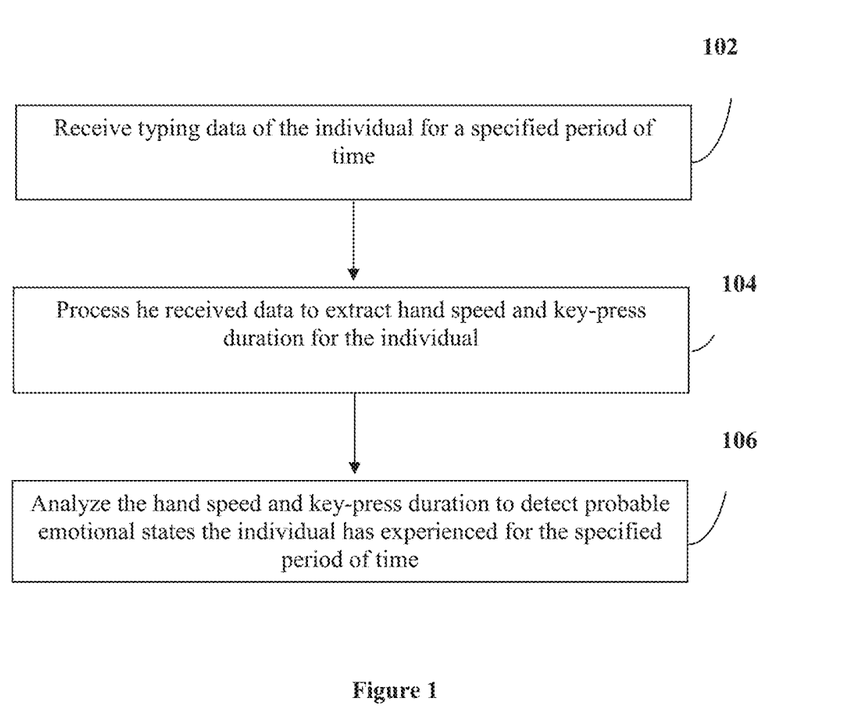
FIG. 1 is a flowchart illustrating a method for detecting emotions based on an individual's typing behaviour.

Referring to FIG. 1, it is a flow chart illustrating method for detecting emotions based on an individual's typing behaviour.

The method starts at step 102, typing data of the individual is received for a specified amount of time. Next, at the step 104, the received data is processed to extract hand speed and key-press duration for the individual. Finally, at step 106, the hand speed and key-press duration are analyzed to detect probable emotional states the individual has experienced for said specified amount of time.

Figure 2:
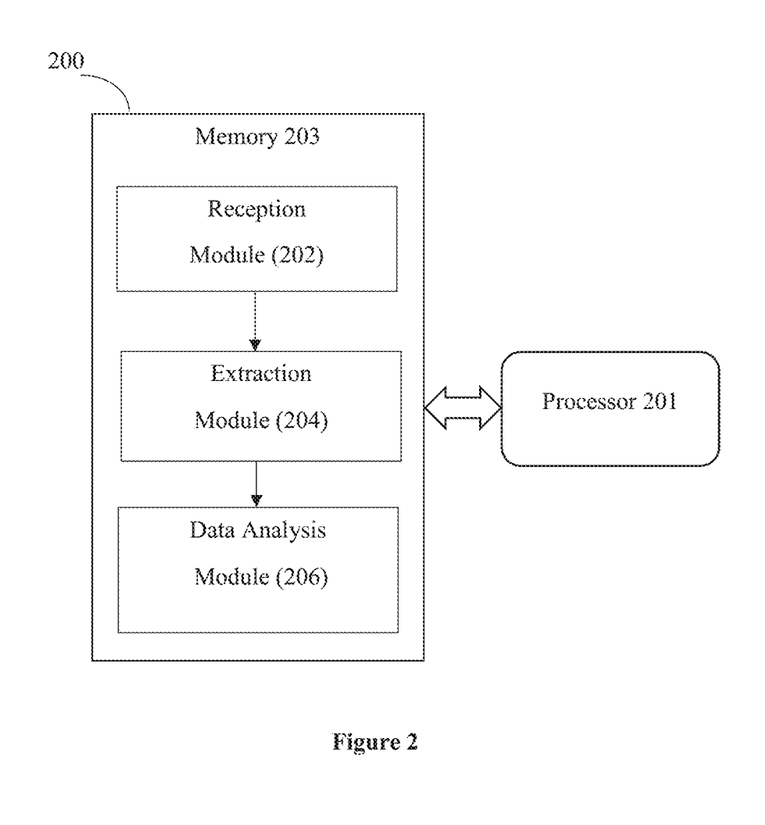
FIG. 2 is a block diagram illustrating a system for detecting emotions based on an individual's typing behaviour.

In another embodiment of the disclosure, a system (200) for detecting emotions based on an Individual's typing behavior is illustrated. The system comprises a processor (201) and a memory (203) coupled with the processor (201). The processor (201) may execute a plurality of modules stored in the memory (203) to implement the method as described above. The plurality of modules may comprise a reception module (202), an extraction module (204) and a data analysis module (206). The reception module (202) may be adapted for receiving typing data of the individual for a specified period of time. The extraction module (204) may be adapted for processing the received data to extract hand speed and key-press duration for the individual. The data analysis module (206) may be adapted for analyzing the extracted data to detect probable emotional states the individual has experienced for the specified amount of time.

In another embodiment of the disclosure, the system (200) is pre-trained using facial video data of a population of individuals for the specified period of time. An artificial neural network (ANN) is trained using offline data. Said offline data primarily comprises of typing data and the corresponding reference emotion that would be detected using facial video data. This data is used for training the ANN for automated classification of emotions based on typing data. Thus, the ANN so generated has the capability to classify emotions for users from general perspective with no individual user level customization.

In another embodiment of the disclosure, the system (200) is further trained and refined using emotion outputs of specific individuals based on the facial video data for the specified period of time. The emotion outputs of the individual based on the facial video data is used as a reference emotion to continuously classify the probable emotional states of the individual. This reference emotion is then used for retraining and refining the ANN. Once trained, the system (200) has the capability for user specific level of emotion detection capability and no longer uses said facial video data for training and starts classifying emotions based on pure typing data. The system (200) may, from time to time, enter into training phase to ensure consistent level of accuracy in detecting user specific emotions.

In an embodiment of the present disclosure, the detection of emotion of an individual is being performed based on the hand-speed and key-press duration of an individual. It is noted that there is a direct correlation between an in individual's emotional states to his or her key-press duration while typing. The key-press duration of an individual is drastically low while the individual is in a happy of state of mind. Similarly, the key-press duration also low when the individual is in a surprised state of mind. But in terms of negative emotions, for example—fear, sadness, disgust and anger, the keystroke duration of an individual is remarkably higher when compared to the positive emotions such as happiness and surprise. Thus, it is proposed that processing of negative emotions is similar in the brain, and similarly, processing of positive emotions is also similar to a considerable extent.

In another embodiment of the present disclosure, it is observed that there is a strong correlation value between hand speed and the emotional state of an individual. There is a trend of increase in the speed of the lateral movement of fingers of a person in the state of happiness.

Figure 3:
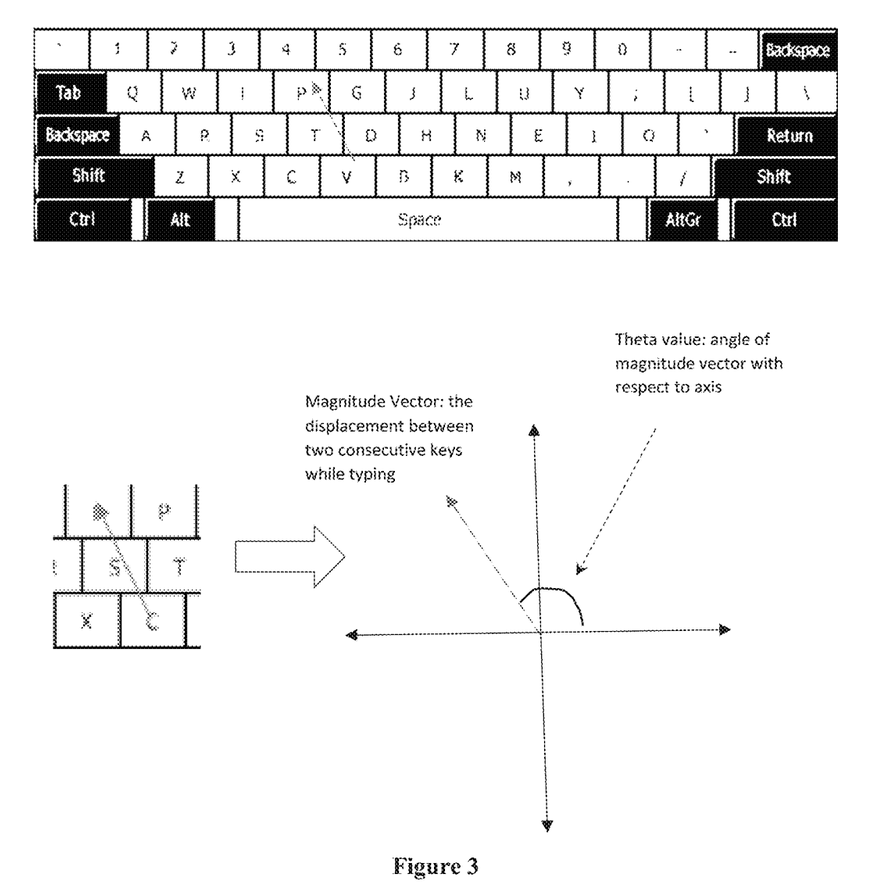
FIG. 3 illustrates the reference framework for the keyboard wherein the distance between two keys is considered the magnitude and the angle with respect to the reference framework

In another embodiment of the present disclosure, the keystroke details of an individual are collected and analyzed with keen details. Since the distance between two keys on the keyboard are not equal, the time which an individual requires to move from one key to another key varies for different key pairs. In order to capture such digraph specific behavior, method is implemented to normalize the time one individual requires from one key to another key. There are 26 English alphabets, hence there are $^{26}C_2$ distances between for the digraphs. However, many distances are equal, as a result, they are clubbed as the same distance. Referring to FIG. 3, a two-dimensional reference coordinate system is set up along the keyboard. For each digraph, a vector is created from the first pressed letter to the second pressed letter. Angular value of this vector with respect to the reference coordinate system is taken as θ. An algorithm may be implemented which attaches the letter position with time stamp. As the text is being typed, continuous di-graphic latencies are being accepted. As a result, the position and the time stamps are continuously being stored. The frequency with which backspace is being pressed is also being taken into account for an accurate measurement of the keystroke analysis.

Figure 4:
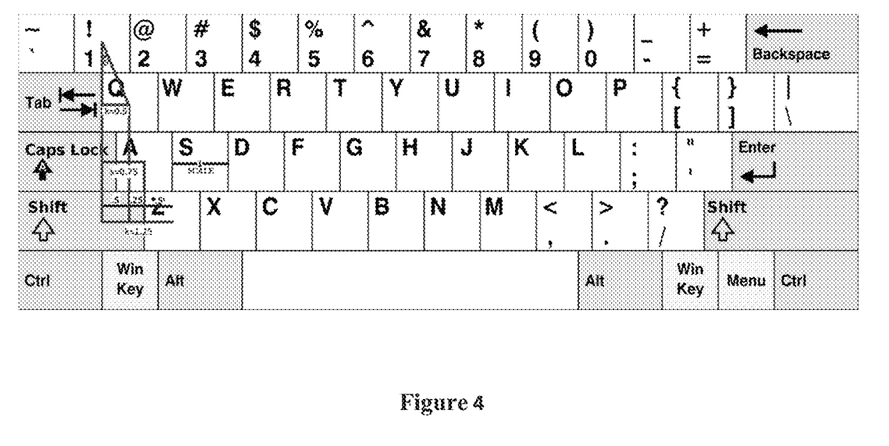
FIG. 4 shows a standard keyboard layout wherein each key length is taken as 1 where the keyboard is viewed as a 4×10 matrix.
Figure 5:
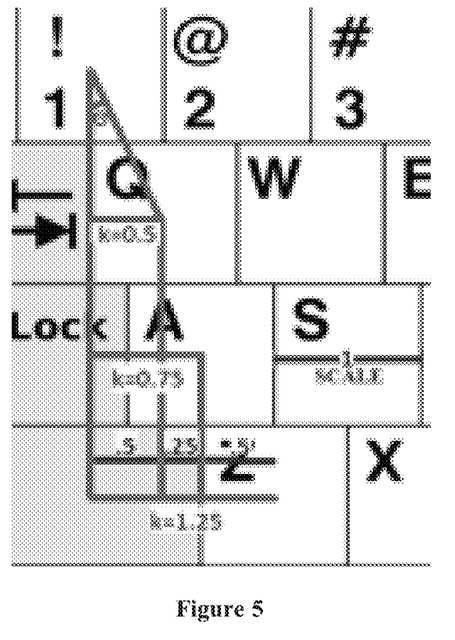
FIG. 5 shows how the shifts of the keys in comparison to above or below row are measured and shows the value of each with respect to the first row.

In another embodiment of the present disclosure, the keys present will have certain angular values at which they can typed faster and it is observed that the digraphs having such θ values have lower latencies. This variance bought about by ergonomic configuration can be easily captured through digraph angle. For the typing data analysis, a typical keyboard has been used while typing i.e. alphabets A-Z and numbers 0-9 along with their corresponding special characters and additional special characters {,} {<} {.} {>} {/} {?} {;} {:}. These keys form a 10×4 matrix as per standard keyboard layout. It is observed that the columns of the above-mentioned matrix are shifted towards the right for each of the 4 rows. As shown in FIG. 4, in the layout for standard keyboard, the first row has been taken as reference and found that second row is shifted by 0.5 unit (where unit=distance between 2 adjacent keys present in the same row, which also equal to length and breadth of every key in the above mentioned matrix as shown in scale in key 'S'). The third row is shifted by 0.75 units with respect to the reference. The fourth row is shifted by 1.25 units with respect to the reference. Considering the theta as shown in the FIG. 5, the distance between every key pair in the above matrix is given by—

$$dist=\text{sqrt}((i-iPrev)^2+(k-kPrev+j-jPrev)^2)$$

Considering the theta as shown in the FIG. 5, the angle between every key pair in the above matrix is given by—

$$\text{angle} = \tan^{-1}((k-k\text{Prev}+j-j\text{Prev})/(i-i\text{Prev}))$$

In the formulas above, i represents the row, j represents the column, and k represents the column shift variable as described in FIG. 5.

Where the key '1' is chosen as the origin reference of the 4×10 matrix, as shown in the table below, with respect to which all the keys in the matrix was mapped with (i,j,k) as shown in the following table—

| 1 | 2 | 3 | 4 | 5 | 6 | 7 | 8 | 9 | 0 |
|---|---|---|---|---|---|---|---|---|---|
| (0, 0, 0) | (0, 1, 0) | (0, 2, 0) | (0, 3, 0) | (0, 4, 0) | (0, 5, 0) | (0, 6, 0) | (0, 7, 0) | (0, 8, 0) | (0, 9, 0) |
| Q | W | E | R | T | Y | U | I | O | P |
| (1, 0, 0.50) | (1, 1, 0.50) | (1, 2, 0.50) | (1, 3, 0.50) | (1, 4, 0.50) | (1, 5, 0.50) | (1, 6, 0.50) | (1, 7, 0.50) | (1, 8, 0.50) | (1, 9, 0.50) |
| A | S | D | F | G | H | J | K | L | ; |
| (2, 0, 0.75) | (2, 1, 0.75) | (2, 2, 0.75) | (2, 3, 0.75) | (2, 4, 0.75) | (2, 5, 0.75) | (2, 6, 0.75) | (2, 7, 0.75) | (2, 8, 0.75) | (2, 9, 0.75) |
| Z | X | C | V | B | N | M | , | . | ? |
| (3, 0, 1.25) | (3, 1, 1.25) | (3, 2, 1.25) | (3, 3, 1.25) | (3, 4, 1.25) | (3, 5, 1.25) | (3, 6, 1.25) | (3, 7, 1.25) | (3, 8, 1.25) | (3, 9, 1.25) |

Thereafter, the speed of typing and keystroke duration is calculated accurately.

In an exemplary embodiment of the disclosure, the emotional states of the individuals are first detected with the help of a publicly available tool at first and then followed by the key-stroke analysis of the individuals. The tool takes photographs of the individuals' faces as inputs and provides the output in the form of which are the dominating emotions at play at any single point of time. The individuals were also made to type on keyboard at the same time. The key-stroke analysis of the individuals and the emotion analysis of the individuals at the same time-stamp proves that there is a direct correlation between the emotional state of an individual and the typing performance of the same individual. The same analysis was performed for fifteen individuals. A correlation coefficient is a coefficient that illustrates a quantitative measure of some type of correlation and dependence, meaning statistical relationships between two or more random variables or observed data values. The Correlation Coefficient varies between −1 to +1. A value of +1 between two variables indicates that there is a direct linear interdependence with each other, in other words an increase of x in one variable lead to an increase of mx in the other variable. Similarly, a value of −1 denotes that the variables are inversely correlated with each other and a value of 0 means that there is no correlation between the variables. A separate correlation analysis was performed for each of the fifteen users. The correlation values of each individual emotion i.e. happiness, surprise, fear, anger, sadness and disgust with different typing parameters such as key-press duration (duration), inter-key-press duration (interval), speed of movement of fingers from one key to the other (hand speed). The results of the correlation analysis as observed is depicted in the FIG. 6. It is observed from FIG. 6 that there is a moderate co-relation value between the key-press duration and emotional states of fear, sadness, disgust and anger. Furthermore, the range of co-relation values for different emotions for all the fifteen users can be assessed from the table below:

| EMOTION NAME | RANGE | | |
|---|---|---|---|
| | MIN | MAX | AVERAGE |
| HAPPINESS | −0.11551927 | 0.05505496 | −0.019290875 |
| SURPRISE | 0.01137849 | 0.25831893 | 0.129426643 |
| FEAR | 0.44520372 | 0.63317274 | 0.563923237 |
| SADNESS | 0.44473768 | 0.65044536 | 0.547944259 |
| DISGUST | 0.47215768 | 0.64277477 | 0.572138469 |
| ANGER | 0.53010257 | 0.65831994 | 0.597599166 |
| NEUTRAL | −0.07089507 | 0.14596629 | 0.060654208 |

Figure 6:
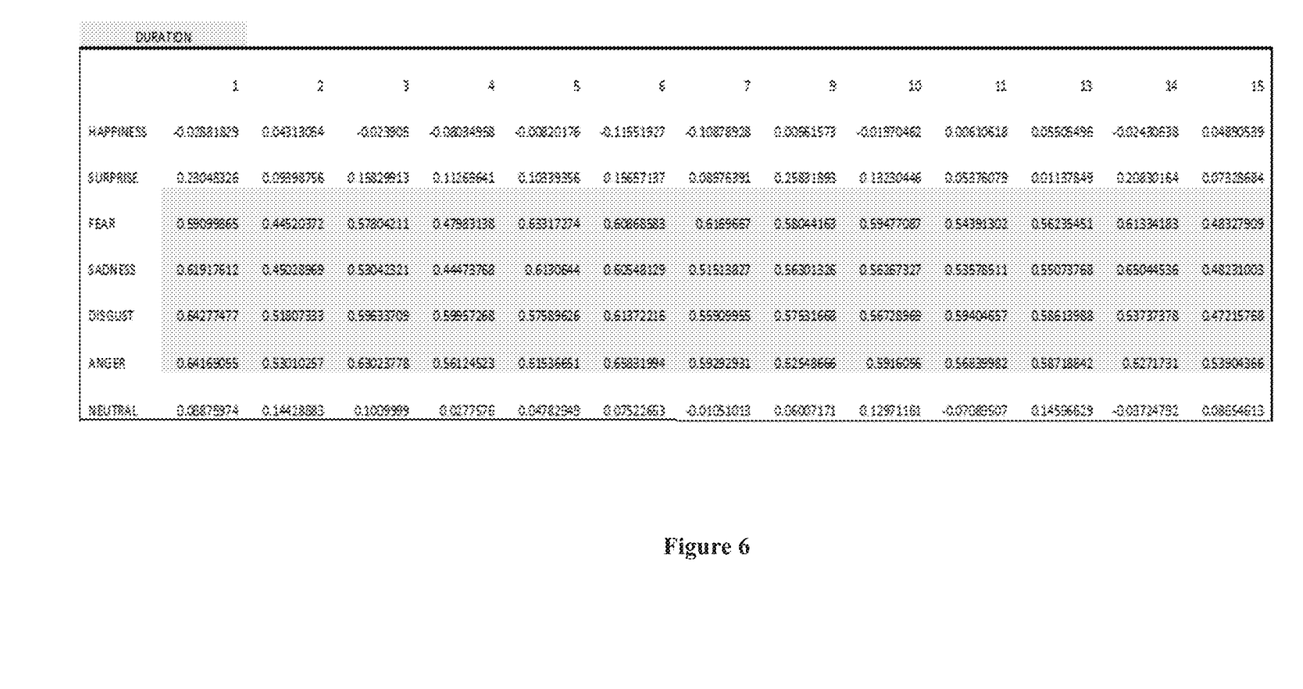
FIG. 6 presents different emotional states with respect to the respective test subjects and shows the level correlation for key press dwell time typing behavior with different emotion states on subject by subject basis.
Figure 7:
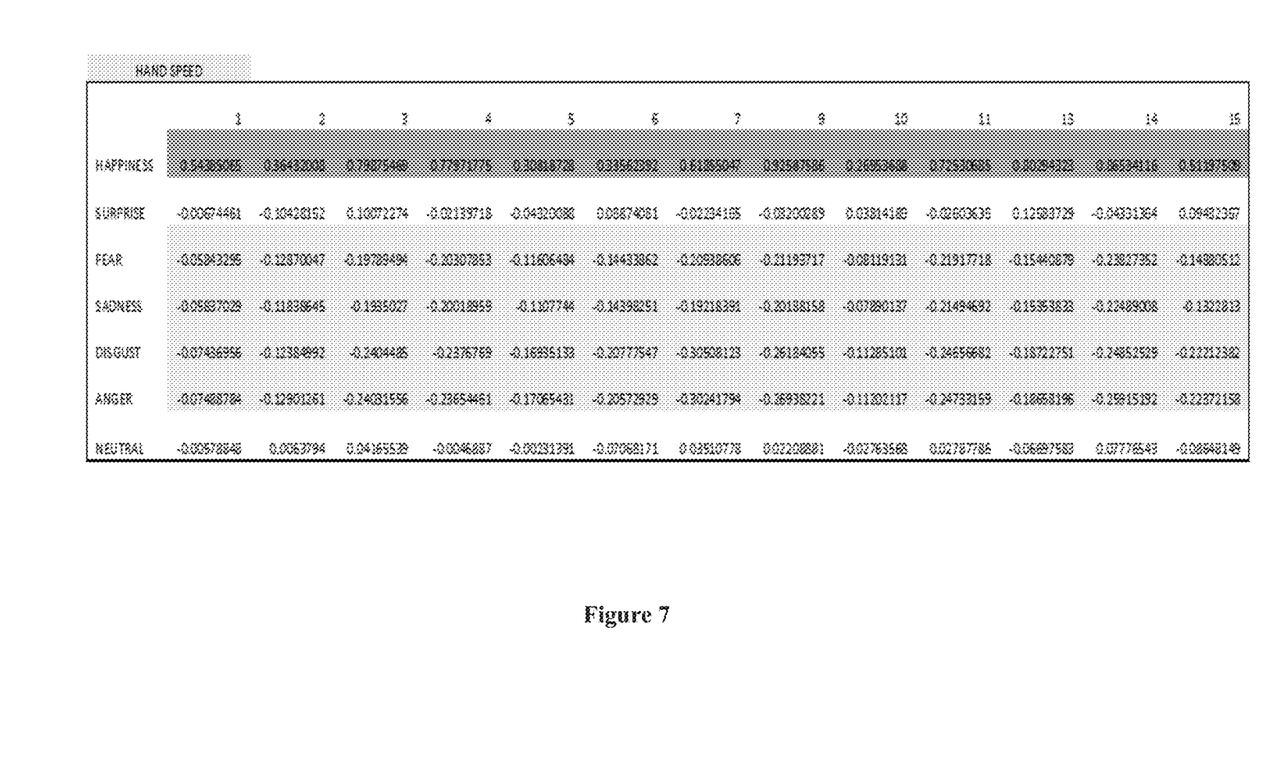
FIG. 7 presents different emotional states with respect to the respective test subjects and shows the level of correlation for speed of lateral finger movement from one key to the next under different emotion states on a subject by subject basis.

It can be distinctly observed that people typing in the state of happiness and surprise does not show any distinct co-relation in their typing pattern. It is also predominantly observed that the people experiencing the negative emotions have a typing behavior pattern with regard to key press duration. It is observed from FIG. 7 that there is a strong correlation between the emotional state and the hand speed. The range value for these emotional states is depicted in the table below.

| EMOTION NAME | RANGE | |
|---|---|---|
| | MIN | MAX |
| HAPPINESS | 0.26953688 | 0.92587586 |
| SURPRISE | −0.10428152 | 0.12583729 |
| FEAR | −0.23827352 | −0.05843295 |
| SADNESS | −0.22489008 | −0.05837029 |
| DISGUST | −0.30508123 | −0.07436956 |
| ANGER | −0.30241794 | −0.07488784 |
| NEUTRAL | −0.08648149 | 0.07776543 |

The average co-relation value of the sample set is 0.603844917. Furthermore, it is observed that the values of co-relation coefficient vary across a large range in the case of hand speed. It can be understood that although there is a general trend of increase in the speed of the lateral movement of fingers of a person in the state of happiness, this amount of increase varies from person to person. It is also noted that a weak inverse co-relation is observed between speed of lateral movement of fingers and the emotional states of fear, sadness, disgust and anger.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" Include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for detecting emotions based on an individual's typing behavior, the system comprising:
   one or more processors; and
   a memory coupled to the one or more processors, wherein the one or more processors executes a plurality of modules stored in the memory, for
   pre-training an artificial neural network (ANN) at general level using facial video data of population of individuals for a specified period of time to enable the ANN to classify emotional states of population of individuals;
   training the artificial neural network (ANN) at user specific individual level using facial video data of specific individuals for the specified period of time to enable the ANN to classify emotional states of the individual;
   receiving typing data of the specific individual to enable the ANN to correlate the typing data with the classified emotional states of the individual;
   refining the ANN using emotion outputs of an individual based on the facial video data and key-strokes of the individual, in order to determine correlation between the emotional state and typing behavior of the individual;
   receiving typing data of the individual for the specified period of time;
   processing the received data to extract hand speed and key-press duration for the individual; and
   analyzing the extracted data based on the determined correlation between the emotional state and typing behavior of the individual in order to detect probable emotional states, the individual has experienced, for the specified period of time, solely based on keystroke and key-press behavior of the specific individual.

2. The system of claim 1, wherein the emotion outputs of the individual based on the facial video data is used as a reference emotion to continuously classify the probable emotional states of the individual.

3. A method for detecting emotions based on an individual's typing behavior, the method comprising:
   pre-training, by a processor, an artificial neural network (ANN) at general level using facial video data of population of individuals for a specified period of time to enable the ANN to classify emotional states of the population of individuals;
   training, by the processor, the artificial neural network (ANN) at user specific individual level using facial video data of specific individuals for the specified period of time to enable the ANN to classify emotional states of the individual;
   receiving, by the processor, typing data of the individual to enable the ANN to correlate the typing data with the classified emotional states of the individual;
   refining, by the processor, the ANN using emotion outputs of an individual based on facial video data and key-strokes of the individual, in order to determine correlation between the emotional state and typing behavior of the individual;
   receiving, by the processor, typing data of the individual for the specified period of time;
   processing, by the processor, the received data to extract hand speed and key-press duration for the individual; and
   analyzing, by the processor, the hand speed and key-press duration based on the determined correlation between the emotional state and typing behavior of the individual in order to detect probable emotional states the individual has experienced for the specified period of time, solely based on keystroke and key-press behavior of the specific individual.

4. The method of claim 3, wherein the hand speed extracted is indicative of the speed of lateral movement based on the speed of the individual's fingers as the fingers move during typing.

5. The method of claim 4, wherein the lateral movement is captured while the individual's fingers move from one key-press to a different key press.

6. The method of claim 5, wherein the lateral movement of fingers while the individual's fingers move from one key-press to a different key press are extracted in the form of inter key-press duration and intra key-press duration.

7. The method of claim 3, wherein the analysis of the hand speed and key-press duration to detect probable emotional states of the individual is performed using correlation analysis methodology.

8. A non-transitory computer readable medium storing a program for detecting emotions based on an individual's typing behavior, the program comprising instructions for:
   pre-training an artificial neural network (ANN) at general level using facial video data of population of individuals for a specified period of time to enable the ANN to classify emotional states of the population of individuals;
   training the artificial neural network (ANN) at user specific individual level using facial video data of specific individual for the specified period of time to enable the ANN to classify emotional states of the individual;

receiving typing data of the individual to enable the ANN to correlate the typing data with the classified emotional states of the individual;

refining the ANN using emotion outputs of an individual based on the facial video data and key-strokes of the individual, in order to determine correlation between the emotional state and typing behavior of the individual;

receiving typing data of the individual for the specified period of time;

processing the received data to extract hand speed and key-press duration for the individual; and analyzing the hand speed and key-press duration based on the determined correlation between the emotional state and typing behavior of the individual in order to detect probable emotional states the individual has experienced for the specified period of time, solely based on keystroke and key-press behavior of the specific individual.

\* \* \* \* \*